United States Patent
Li et al.

(10) Patent No.: US 9,423,898 B2
(45) Date of Patent: Aug. 23, 2016

(54) PREPARATION METHOD OF ONE GLASS SOLUTION TOUCH SCREEN

(71) Applicants: Shanghai Tianma Micro-Electronics Co., Ltd., Shanghai (CN); Tianma Micro-Electronics Co., Ltd., Shenzhen (CN)

(72) Inventors: Yujun Li, Shanghai (CN); Bengang Zhao, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 199 days.

(21) Appl. No.: 14/224,014

(22) Filed: Mar. 24, 2014

(65) Prior Publication Data

US 2015/0059169 A1    Mar. 5, 2015

(30) Foreign Application Priority Data

Aug. 30, 2013    (CN) .......................... 2013 1 0390159

(51) Int. Cl.
*H05K 3/02* (2006.01)
*H05K 3/10* (2006.01)
*G06F 3/041* (2006.01)
*C03B 27/00* (2006.01)
*C03C 17/00* (2006.01)

(52) U.S. Cl.
CPC ................ *G06F 3/041* (2013.01); *C03B 27/00* (2013.01); *C03C 17/002* (2013.01); *C03C 2217/948* (2013.01); *C03C 2218/33* (2013.01); *C03C 2218/34* (2013.01); *G06F 2203/04103* (2013.01); *Y10T 29/49124* (2015.01)

(58) Field of Classification Search
CPC .......... G06F 3/041; G06F 2203/04103; G02F 1/133; C03B 27/00; C03B 33/074; H05K 3/0097; Y10T 29/49124; Y10T 29/49155; Y10T 29/49163
USPC ........... 29/830, 846, 851, 414, 415; 65/30.14; 359/609; 428/192, 209, 210, 901
See application file for complete search history.

(56) References Cited

U.S. PATENT DOCUMENTS

| 5,062,916 A | * | 11/1991 | Aufderheide | ........ H05K 3/0097 29/846 |
| 6,814,452 B2 | * | 11/2004 | Kusuda | ................... G02F 1/133 359/609 |
| 2012/0064306 A1 | * | 3/2012 | Kang | .................... C03B 33/074 428/192 |

FOREIGN PATENT DOCUMENTS

| CN | 102508586 A | 6/2012 |
| CN | 102736813 A | 10/2012 |
| CN | 103159411 A | 6/2013 |
| WO | 2012023360 A1 | 2/2012 |

* cited by examiner

*Primary Examiner* — Donghai D Nguyen
(74) *Attorney, Agent, or Firm* — Alston & Bird LLP

(57) ABSTRACT

A method of preparing an OGS touch screen is disclosed. The method includes forming a first film layer on a provided substrate, where the first film layer includes at least one hollow region and a protection film surrounding each hollow region. The method also includes tempering each hollow region by tempering the substrate, and removing the protection film on the substrate.

9 Claims, 5 Drawing Sheets

PREPARATION METHOD OF ONE GLASS SOLUTION TOUCH SCREEN

CROSS-REFERENCES TO RELATED APPLICATIONS

This application claims the benefit of priority to Chinese Patent Application No. 201310390159.4, filed with the Chinese Patent Office on Aug. 30, 2013 and entitled "PREPARATION METHOD OF ONE GLASS SOLUTION TOUCH SCREEN", the content of which is incorporated herein by reference in its entirety.

TECHNICAL FIELD

The present application relates to the field of manufacturing of touch screens, and in particular to a preparation method of a One Glass Solution touch screen.

BACKGROUND OF THE INVENTION

One Glass Solution (OGS) touch screen is a technique which Indium Tin Oxide (ITO) conductive films and sensors are directly formed on protection glass. In this technique, a piece of glass plays dual roles of protection glass and a touch sensor. An OGS touch screen has the advantages of simple structure, small overall thickness, light weight and high light transmissivity, and meanwhile, since a piece of glass substrate and a bonding process are saved, the production cost is reduced.

In the existing production process of the OGS touch screen, the glass substrate is firstly tempered and then cut according to the design specification of a single screen, since the position to be cut is tempered, cracks are generated in the cutting process due to stress release in the cutting process of the single screen, and the edges of the cut single screen need to be ground to remove most of edge cracks. Generally, a process of coating sealing glue on the edges of the single screen is adopted to control the stress release and prevent collision on the residual edge cracks, however, this coating process can not completely eliminate the stress release problem in the cutting process of the single screen, thus the cutting process yield is low; and moreover, a complex process is needed subsequently to eliminate a part of edge cracks and effects resulting from the same, so that the production efficiency is low.

BRIEF SUMMARY OF THE INVENTION

One inventive aspect is a method of preparing an OGS touch screen. The method includes forming a first film layer on a provided substrate, where the first film layer includes at least one hollow region and a protection film surrounding each hollow region. The method also includes tempering each hollow region by tempering the substrate, and removing the protection film on the substrate.

DETAILED DESCRIPTION OF THE PREFERRED EMBODIMENTS

Detailed description is made below on the realization process of the embodiment of the present invention in combination with drawings in the specification. It should be noted that the same or similar reference numbers throughout denote the same or similar elements or elements with the same or similar functions. The embodiments described below in reference to the drawings are exemplary and are only used for explaining the present invention rather than limiting the present invention.

Figure 1:
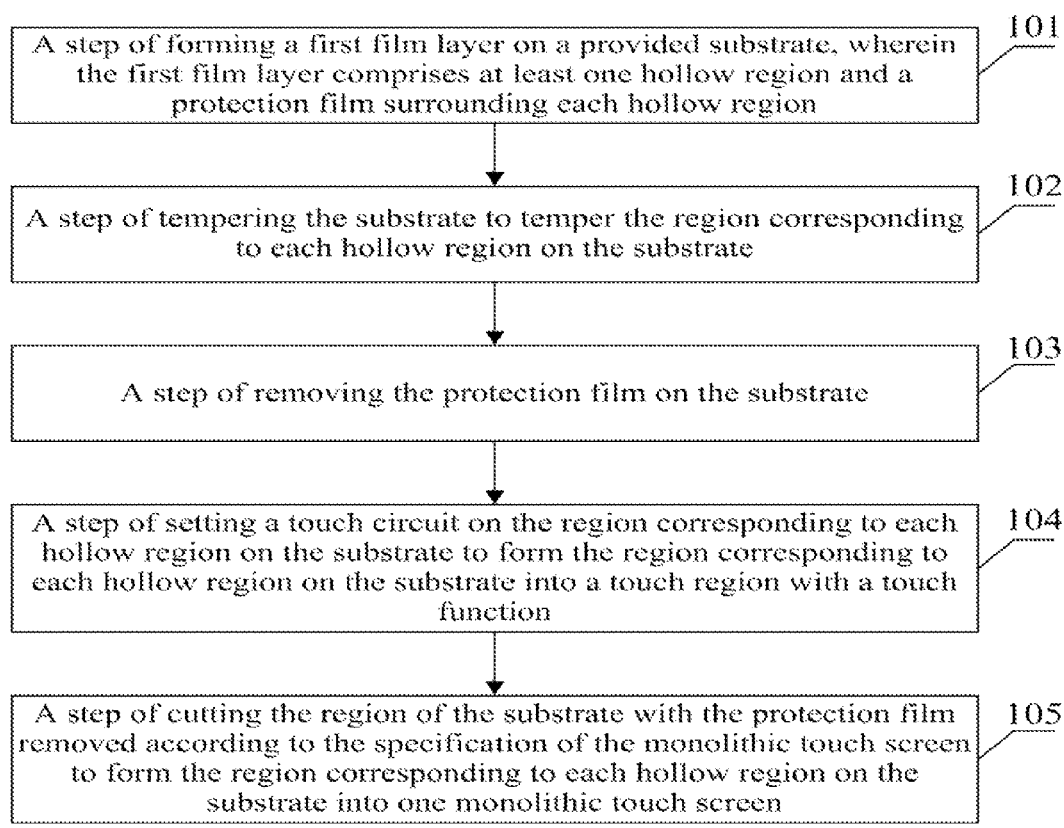
FIG. 1 is a flow chart of a preparation method of an OGS touch screen provided by the embodiment of the present invention.

As shown in FIG. 1, a preparation method of an OGS touch screen provided by the embodiment of the present invention includes:

101. a step of forming a first film layer 2 on a provided substrate 1, wherein the first film layer 2 includes at least one hollow region 21 and a protection film 22 surrounding each hollow region 21.

The first film layer 2 can be formed on the substrate 1 in multiple manners. For example, a thin film used for protecting the substrate 1 is coated, and the thin film is exposed and developed with a mask plate to form the first film layer 2 provided with at least one hollow region 21 and the protection film 22 surrounding each hollow region 21.

As another example, the first film layer 2 provided with at least one hollow region and the protection film surrounding each hollow region is directly formed on the substrate 1 by a silk screen printing process.

Preferably, the protection film 22 is formed by any one of photoresist, spin coated light-sensitive ink and an acid/alkali-resistant thin film.

Of course, when the first film layer 2 is formed, the first film layer 2 can be optionally arranged on a single surface or double surfaces of the substrate 1 according to the thickness of the substrate 1, and specific parameters are determined according to different design and production requirements.

It should be noted that the above mentioned implementation of forming the first film layer 2 is only an example, and the present invention is not limited thereto.

In the embodiment, the first film layer 2 is formed on the substrate 1 by coating or the silk screen printing process, which causes no effect on the existing procedures and is easy to implement; and meanwhile, a pattern which is the pattern of the hollow region can be flexibly designed according to the specification of the required single screen.

Figure 2:
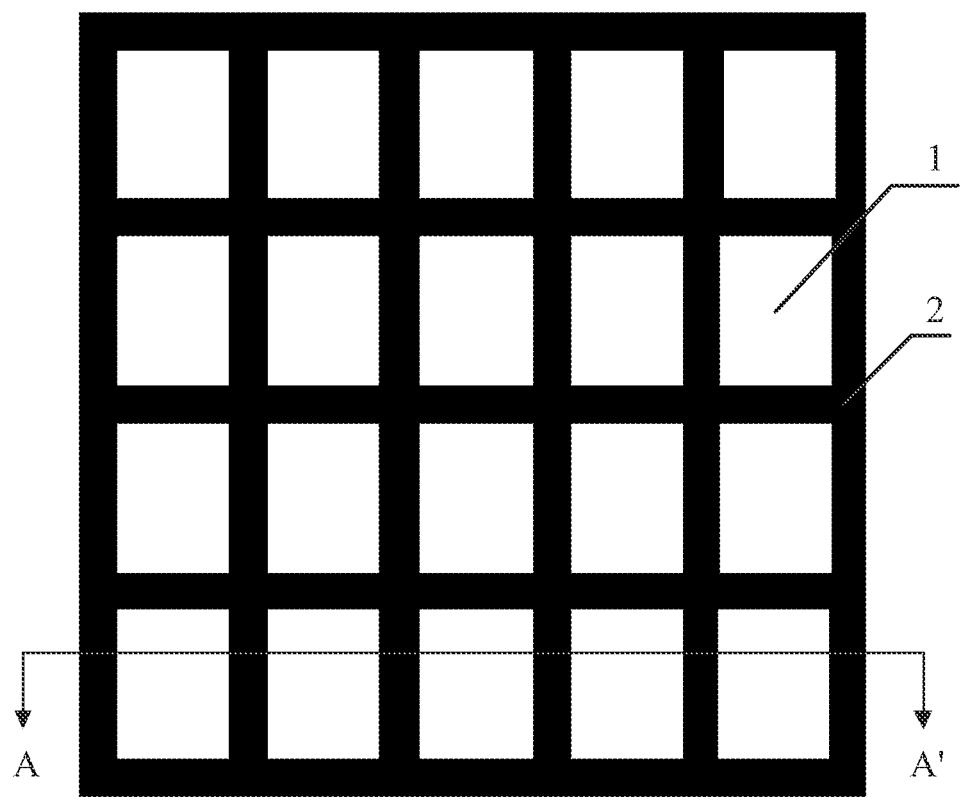
FIG. 2 is a schematic top view of a substrate formed with a first film layer provided by the embodiment of the present invention.

Refer to FIG. 2 which shows a schematic top view of the substrate 1 formed with the first film layer 2. The first film layer 2 and the substrate 1 are marked in the FIG. 2.

Figure 3:
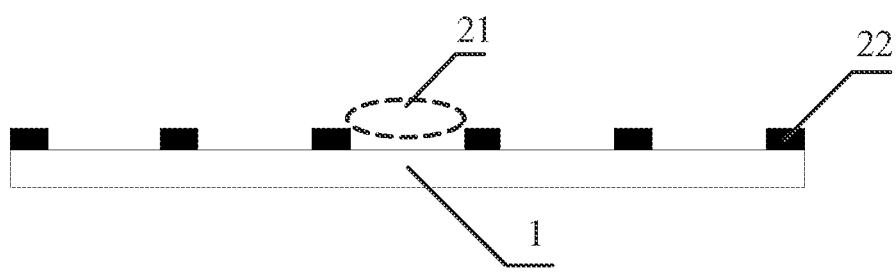
FIG. 3 is a cross-section view of the substrate formed with the first film layer as shown in FIG. 2 taken along AA'.

Refer to FIG. 3 which is a cross-section view of the substrate 1 formed with the first film layer 2 as shown in FIG. 2 taken along AA'. The substrate 1, the hollow region 21 and the protection film 22 of the first film layer 2 are shown in FIG. 3.

Figure 4:
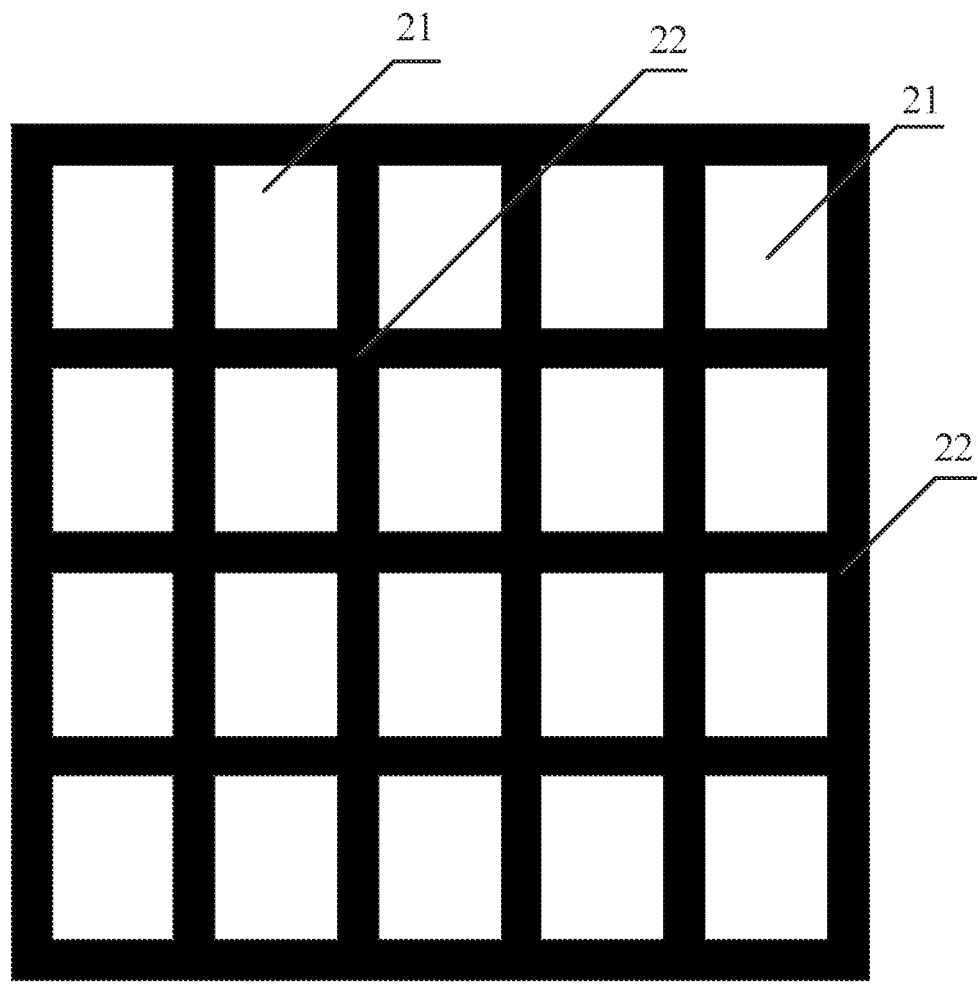
FIG. 4 is a schematic top view of the first film layer in the embodiment of the present invention.

In order to describe the first film layer 2 more clearly, refer to FIG. 4 which shows a schematic top view of the first film layer 2, including the hollow region 21 and the protection film 22.

102. a step of tempering the substrate 1 to temper the region corresponding to each hollow region 21 on the substrate 1.

Since the first film layer 2 arranged on the substrate is provided with the protection film 22, it can be ensured that the region covered by the protection film 22 can not be tempered. When the substrate 1 is tempered, the whole substrate or only the substrate at the hollow region 21 can be tempered, and meanwhile, a material selected in the tempering process can be a material in the existing tempering process as long as the protection film 22 is not broken. For example, KNO3 is used for tempering the region corresponding to each hollow region 21 on the substrate 1.

Figure 5:
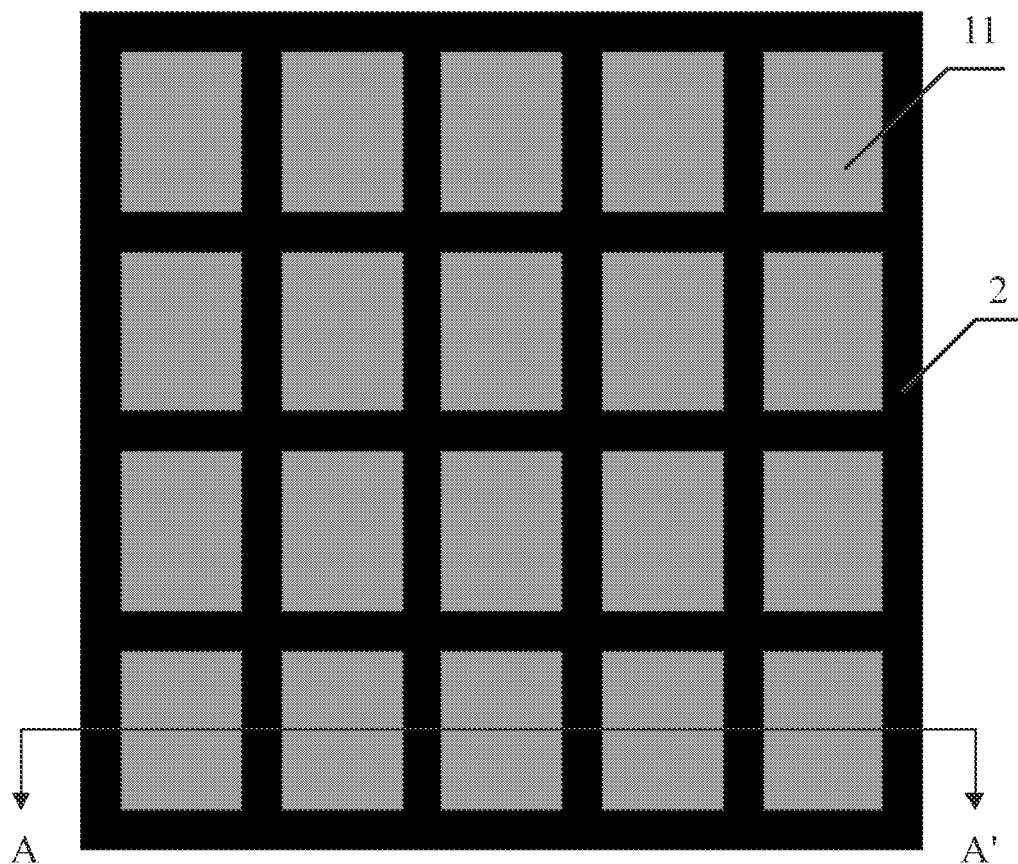
FIG. 5 is a schematic top view of the tempered substrate formed with the first film layer in the embodiment of the present invention.
Figure 6:
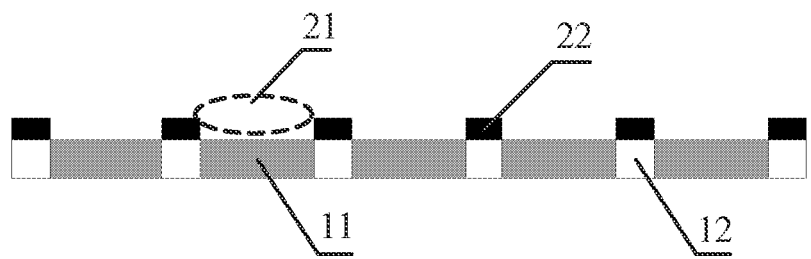
FIG. 6 is a cross-section view of the tempered substrate formed with the first film layer as shown in FIG. 5 taken along AA'.

The tempered substrate 1 is as shown in FIG. 5 (the first film layer 2 is not removed), the region of the tempered substrate 1 corresponding to each hollow region 21 (not shown in FIG. 5) of the first film layer 2 is tempered to form a tempered region 11. Refer to FIG. 6 which is a cross-section view of the tempered substrate 1(the first film layer 2 is not removed) as shown in FIG. 5 taken along AA', the tempered region 11 and a non-tempered region 12 of the substrate 1, and the hollow region 21 and the protection film 22 of the first film layer 2 are shown.

According to the embodiment, the tempered region corresponding to the hollow region 21 and the non-tempered region corresponding to the protection film 22 are formed after the tempering procedure, so that when a region corresponding to the protection film 22 on the substrate 1 is cut subsequently, the region can be easily cut, and stress release can be avoided.

103. a step of removing the protection film 22 on the substrate 1. The protection film 22 can be removed in multiple manners. For example, the protection film 22 is removed from the tempered substrate 1 by tearing off or soaking in acidic liquid. Soaking the tempered substrate 1 in the acidic liquid is easy to realize, and can realize large-scale mass production.

Figure 7:
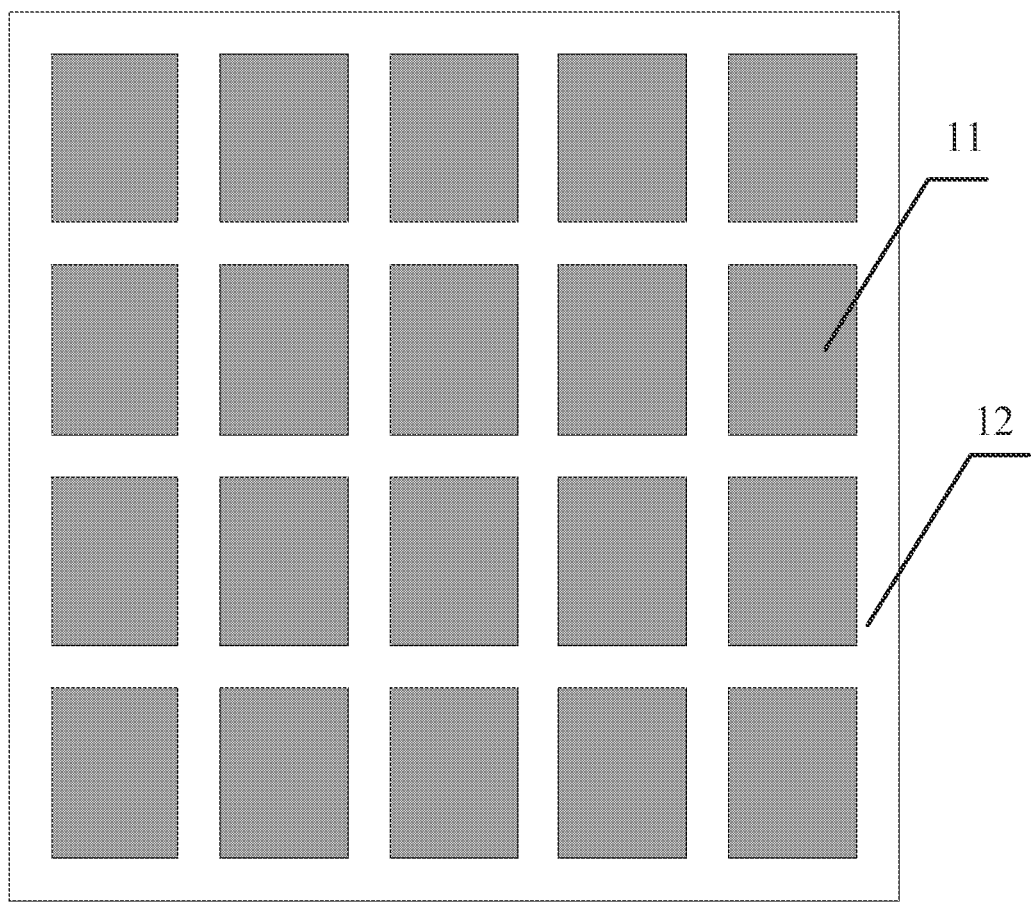
FIG. 7 is a schematic top view of the tempered substrate with the first film layer removed.

Refer to FIG. 7 which shows the tempered substrate 1 with the protection film 22 removed, including the tempered region 11 and the non-tempered region 12, wherein the tempered region 11 is a specification dimension of an OGS touch screen meeting the design requirements.

Based on the purpose of forming a complete OGS touch screen, the method further includes the following steps on the basis of the steps 101-103:

104. a step of setting a touch circuit on the region corresponding to each hollow region 21 on the substrate 1 with the protection film 22 removed so that the region corresponding to each hollow region 21 on the substrate 1 is formed into a touch region with a touch function.

105. a step of cutting the region with the protection film removed on the substrate 1 according to the specification of the OGS touch screen so that the region corresponding to each hollow region 21 on the substrate is formed into one OGS touch screen, wherein each OGS touch screen includes one touch region.

In order to ensure more accurate alignment of forming the first film layer 2 and ensure more accurate alignment in the cutting process, it is necessary to set an alignment mark. For example, before forming the first film layer 2 on the provided substrate 1, the method further includes:

a step of forming an alignment mark on the substrate 1 by silk screen printing process, etching process or printing process; wherein the alignment mark is used for alignment when the protection film 22 is formed and used for creating a coordinate system when the touch circuit is set. Based on the setting of the alignment mark, after the step 103, the method further includes: a step of performing silk screen printing to form a black frame in the region with the protection film 22 removed on the substrate; in the step 105, a cutting process is performed according to the silk screen printed black frame so that the region corresponding to each hollow region 21 on the substrate 1 is formed into one OGS touch screen, and the number of the formed OGS touch screens is in one-to-one correspondence with the number of the hollow regions 21. Since the fixed alignment mark is arranged, the alignment offset problem in the manufacturing procedure is decreased.

The beneficial effects of the embodiment of the present invention are as follows: the protection film is arranged on the glass substrate to prevent the protection film region from being tempered when the glass substrate is tempered, no stress release is generated in the cutting process to improve the cutting process yield, and the process steps are simple and easy to realize modeling so as to beneficially improve the production efficiency.

Obviously, various modifications and variations may be made by those skilled in the art without departing from the spirit and scope of the present invention. Thus, the present invention is also intended to encompass these modifications and variations thereto provided that these modifications and variations come into the scope of the claims of the present invention and equivalents thereof.

What is claimed is:

1. A method of preparing an One Glass Solution (OGS) touch screen, the method comprising:
   forming a first film layer on a provided glass substrate, wherein the first film layer comprises at least one hollow region and a protection film surrounding each hollow region;
   tempering each hollow region by tempering the glass substrate;
   removing the protection film on the glass substrate;
   placing a touch circuit on the glass substrate in a location corresponding to each hollow region, such that the location corresponding to each hollow region is a touch region with a touch function; and
   cutting the glass substrate, such that each hollow region on the glass substrate corresponds to an OGS touch screen, wherein each OGS touch screen comprises one touch region, and wherein the cutting of the glass substrate occurs after the removing of the protection film on the glass substrate.

2. The method according to claim 1, wherein, before forming the first film layer on the provided glass substrate, the method further comprises:
   forming an alignment mark on the glass substrate with a silk screen printing process, an etching process, or a printing process, wherein the alignment mark is configured to be used for alignment during a formation of the protection film, and is configured to at least partly form a coordinate system when the touch circuit is placed.

3. The method according to claim 2, further comprising:
   silk screen printing a black frame in the region from which the protection film has been removed, wherein the silk screen printing is aligned using the alignment mark.

4. The method according to claim 3, wherein cutting the glass substrate comprises:
   cutting the glass substrate according to the silk screen printed black frame so that the region corresponding to each hollow region on the glass substrate is formed into one OGS touch screen, and the number of the formed OGS touch screens is in one-to-one correspondence with the number of the hollow regions.

5. The method according to claim 1, wherein forming the first film layer comprises:
coating a thin film used for protecting the glass substrate on one or more surfaces of the glass substrate; and
forming the thin film into the first film layer using an exposure process.

6. The method according to claim 1, wherein forming the first film layer comprises:
directly forming the first film layer on one or more surfaces of the glass substrate using a silk screen printing process.

7. The method according to claim 1, wherein tempering each hollow region comprises:
tempering the region corresponding to each hollow region on the glass substrate using $KNO_3$.

8. The method according to claim 1, wherein of removing the protection film comprises:
removing the protection film by soaking the tempered glass substrate in an acidic liquid.

9. The method according to claim 1, wherein the protection film is formed by using any one of a photoresist, a spin coated light-sensitive ink, and an acid/alkali-resistant thin film.

* * * * *